Patented Dec. 9, 1952

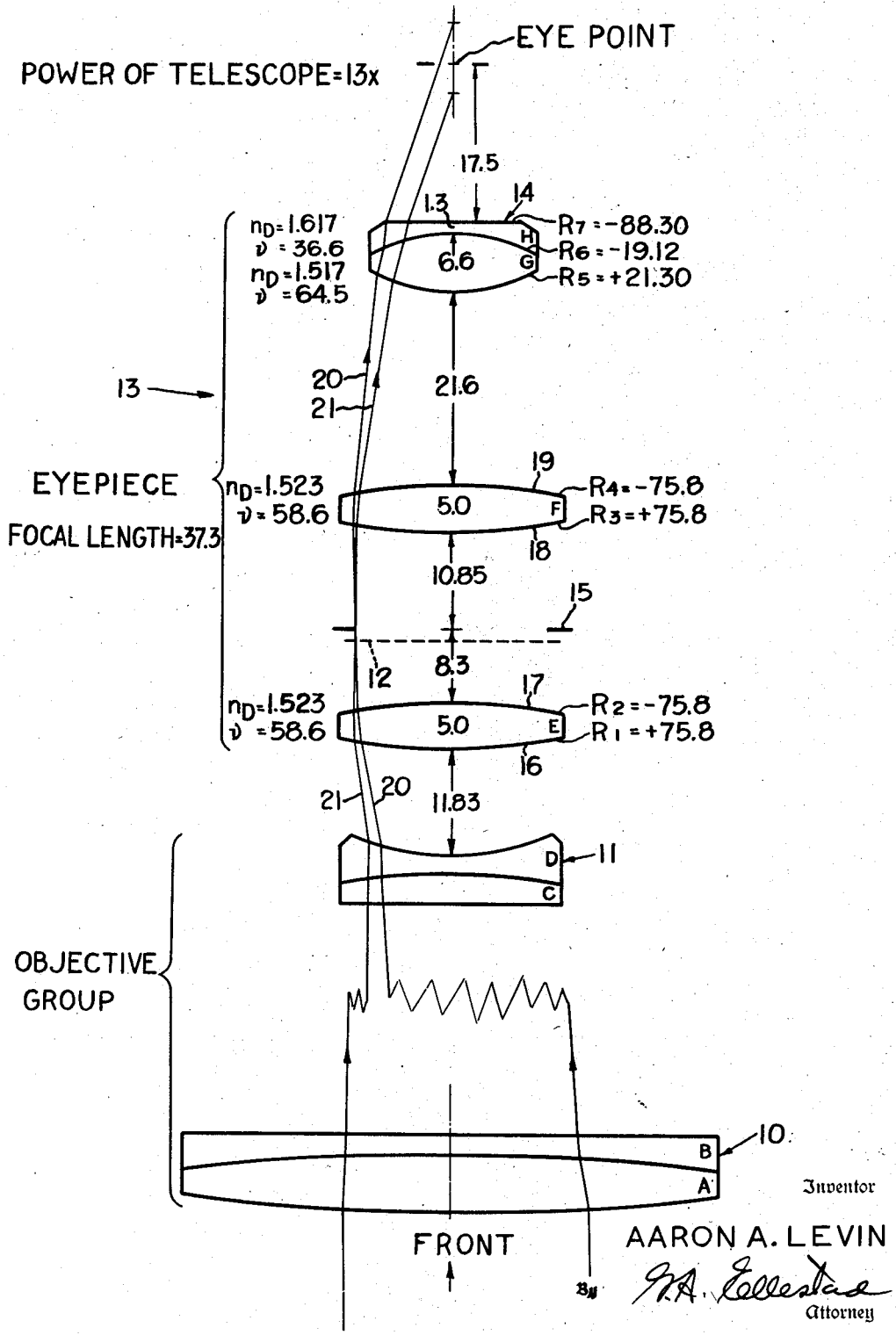

2,620,706

UNITED STATES PATENT OFFICE 2,620,706

EYEPIECE FOR TELESCOPES

Aaron A. Levin, Rochester, N. Y., assignor to Bausch & Lomb Optical Company, Rochester, N. Y., a corporation of New York Application September 23, 1948, Serial No. 50,832

1 Claim. (Cl. 88—32)

This invention relates to telescopes of relatively low power and in particular to the optical system of the eyepiece thereof.

When designing telescopes for certain uses, it is desirable to make the instrument easily convertible from high to low power and at the same time provide a relatively long eye distance and large apparent field. In accordance with common usage, the term "eye distance" refers to the distance from the vertex of the rearmost refractive surface of the eye lens to the exit pupil or eye point of the eyepiece where the principal rays intersect along the optical axis.

The proper and efficient use of a telescope requires that the observer be able to place his eye substantially at the eyepoint of the instrument. When an observer wears spectacles, he cannot, of course, place his eye close to the eye lens of the telescope. Hence it is desirable that a telescope have an eye distance which is long enough to permit proper use of the instrument by a person wearing spectacles or the like. A long eye distance of about 16 mm. or more and large apparent field are desirable together with good correction of astigmatic, chromatic, comatic, and spherical aberrations and distortion and flatness of the field. Such a telescope may be provided in high powers, i. e., approximately 15-power or more, by the use of a dispersive lens between the objective and eyepiece lenses. However, when converting such a high power telescope to low power, i. e., between 10 and 15 power, by the mere substitution of eyepieces, the optical form of the low power eyepiece must be somewhat different than that of the high power eyepiece because of the effect of the dispersive lens; otherwise the long eye distance can only be obtained at the expense of unduly restricting the apparent field.

It is an object of this invention to provide a novel optical system for a low power eyepiece for a telescope of the above-mentioned type which affords a relatively long eye distance and large apparent field and is well corrected for astigmatic, chromatic, comatic, and spherical abberations and distortion and flatness of the field. Another object is to provide such a device by arranging a collective lens on each side of the diaphragm in the eyepiece of the telescope.

These and other objects and advantages will be apparent in the arrangement and combination of the parts of the eyepiece by referring to the following description and accompanying drawing in which the figure shows, diagrammatically, my novel eyepiece associated with the objective of a telescope.

As shown diagrammatically in the drawing, the telescope comprises an objective lens 10 of any desired form such as the achromatic doublet shown having elements A and B. Lens 10 together with a doublet dispersive lens 11 having elements C and D form a cooperative objective group of lenses which are optically corrected in a complementary manner so as to form an image at their focal plane 12 that is substantially free of spherical, chromatic, comatic, and astigmatic aberrations and distortion and curvature of the field.

A novel eyepiece 13, which is optically corrected with regard to the aforesaid aberrations and distortion and flatness of the field to match the objective group of lenses, provides together with the objective group a telescope of low power, the term "low power" meaning powers between substantially 10 and 15. Eyepiece 13 includes an eye lens 14 which is preferably an achromatic doublet composed of the elements G and H which are made of optical material having indices of refraction of 1.517 and 1.617, respectively, and $\tau$ values of 64.5 and 36.6, respectively. Also included in eyepiece 13 is a diaphragm 15 or field stop close to the focal plane 12.

According to this invention, the eyepiece 13 includes a pair of collective lenses E and F which are formed from optical material having indices of refraction of 1.523 and $\tau$ values of 58.6 and are spaced from the opposite sides of diaphragm 15 between the eye lens 14 and dispersive lens 11. The front collective lens E is located between the dispersive lens 11 and the focal plane 12 so that the vertex of the front surface 16 is spaced at a distance from said plane, said distance being substantially 1.5–3.5% of the equivalent focal length of the objective group of lenses 10 and 11. This arrangement of lens E in the eyepiece is designed to reduce the size of the image which is formed in focal plane 12 before the object rays reach diaphragm 15 so as to provide a relatively large apparent field and long eye distance together with fine image quality and absence of substantially all color from the field of the instrument.

In the illustrated form of this invention, the collective lenses E and F are provided with symmetrical front and back convex surfaces 16, 17 and 18, 19, respectively, but such a construction is not essential. It has been discovered that the radius of curvature of any of the refractive surfaces 16, 17, 18, and 19 on lenses E and F may be as much as twice the radius of the mutually opposite refractive surface on the same lens with acceptable results. Collective lens E, per se, possesses collective power such that the image formed by lenses 10 and 11 at focal plane 12 is reduced in size by a factor of substantially 1.10–1.25. The space between the adjacent vertices of the surfaces 17 and 18 on lenses E and F, respectively, should be substantially 40–60% of the equivalent focal length of eyepiece 13, and the combined equivalent focal length of collective lenses E and F together should be 1.05–1.25 times the equivalent focal length of eyepiece 13. Furthermore, the distance from diaphragm 15 to the vertex of the front surface 16 of the lens E is equal to 25–40% of the equivalent focal length of the eyepiece 13. This construction provides an eyepiece having an eye distance which is substantially equal to 42–52% of the focal length of the eyepiece 13.

Projecting through the lenses of the telescope, a pair of rays 20 and 21 are shown in the drawing representing the extreme rays in a tangential section of the bundle of rays which pass through the telescope, said rays proceeding from a point at the extreme edge of the real field of view. These rays meet the optical axis of the instrument in the vicinity of the eyepoint which is shown as an image of the aperture stop of the telescope at an advantageously long distance to the rear of the eye lens 14.

The telescope as disclosed is a complete and operative optical instrument but it will be understood that for practical purposes an image-erecting device, such as a combination of prisms, could be used in the space between lenses 10 and 11 if desired and still remain within the scope of this invention. If a prismatic erector is used, it is corrected along with the objective group of lenses for the aforementioned aberrations and the extreme rays 20 and 21 will pass through the optical system in much the same manner as shown in the drawing.

An example of constructional data for an eyepiece constructed in conformity with the above specifications is given below in which $n_D$ is the index of refraction of the lens glass for the D line of the spectrum, $\nu$ is the dispersive index of the lens glass, $R_1$ to $R_7$ are radii of curvature of the lens surfaces measured in linear units, the surfaces convex to incident light being positive and the surfaces concave to incident light being negative, $t_1$ to $t_4$ are axial thicknesses of lenses E, F, G, and H, and $S_1$ and $S_3$ are the air spaces.

[Eyepiece E. F.=37.3.]

| Lens | $n_D$ | $\nu$ | Radii | Thicknesses and Spaces |
|---|---|---|---|---|
| E | 1.523 | 58.6 | $R_1=+75.8$<br>$R_2=-75.8$ | $t_1=5.0$<br>$S_1=8.3$<br>$S_2=10.85$ |
| F | 1.523 | 58.6 | $R_3=+75.8$<br>$R_4=-75.8$ | $t_2=5.0$<br>$S_3=21.6$ |
| G | 1.517 | 64.5 | $R_5=+21.3$<br>$R_6=-19.12$ | $t_3=6.6$<br>$t_4=1.3$ |
| H | 1.617 | 36.6 | $R_7=-88.3$ | |

The nominal power of a telescope constructed as specifically shown and described herein, is approximately 13× and the eye distance is equal to substantially 17.5 mm.

Although necessary to effect a long eye distance, the dispersive lens 11 in the optical system creates a problem in the elimination of visible color from that part of the field near the diaphragm. As already stated, the solution of the problem is facilitated by achromatizing each group of lenses, i. e., the objective group and the eyepiece group, by themselves. The arrangement of the lenses E, F, G, and H, the curvature and spacing of the refractive surfaces of these lenses and the position of diaphragm 15 are so chosen as to eliminate substantially all visible color from either the diaphragm or the image in the field of the telescope.

From the foregoing, it will be seen that a telescope so constructed embodies means for providing a relatively long eye distance and large apparent field while obtaining substantially complete achromatization of the entire field and good image quality generally. Although but one form of this invention is shown and described in detail, other forms are possible within the limits specified in the foregoing description and changes and substitutions may be made without departing from the spirit of the invention as defined in the appended claim.

I claim:

An optical system for a telescope comprising an objective lens group including objective and dispersive lenses, and an eyepiece for viewing the image formed by the objective lens group, said eyepiece consisting of an eyelens doublet, a diaphragm and two collective lenses spaced on opposite sides of the diaphragm, the objective lens group forming an image in a plane located adjacent the diaphragm, the lenses of the eyepiece having a focal length of 37.3 mm. and having constructional data as defined in the following table, the letters in the first column designating the component lens elements of the eyepiece in order from front to rear, $N_D$ being the refractive index, $\nu$ being the dispersion index, $R_1$ to $R_7$ being the radii of the refracting surfaces from front to rear and the signs + and − indicating, respectively, convex and concave surfaces relative to incident light, $t_1$ to $t_4$ being the axial thicknesses of the elements and $S_1$ to $S_3$ being the axial spaces between the elements from front to rear:

| Element | $N_D$ | $\nu$ | Radii | Thicknesses and Spacings |
|---|---|---|---|---|
| E | 1.523 | 58.6 | $R_1=+75.8$<br>$R_2=-75.8$ | $t_1=5.0$<br>$S_1=8.3$<br>$S_2=10.85$ |
| F | 1.523 | 58.6 | $R_3=+75.8$<br>$R_4=-75.8$ | $t_2=5.0$<br>$S_3=21.6$ |
| G | 1.517 | 64.5 | $R_5=+21.3$<br>$R_6=-19.12$ | $t_3=6.6$<br>$t_4=1.3$ |
| H | 1.617 | 36.6 | $R_7=-88.3$ | |

AARON A. LEVIN.

REFERENCES CITED

The following references are of record in the file of this patent:

UNITED STATES PATENTS

| Number | Name | Date |
|---|---|---|
| 936,541 | Kellner | Oct. 12, 1909 |
| 1,097,635 | Humbrecht | May 26, 1914 |
| 1,116,069 | Jacob | Nov. 3, 1914 |
| 1,143,667 | Von Rohr | June 22, 1915 |
| 1,236,722 | Lange | Aug. 14, 1917 |
| 1,464,655 | Jacob | Aug. 14, 1923 |
| 1,468,762 | Taylor et al. | Sept. 25, 1923 |
| 1,549,579 | Lenouvel | Aug. 11, 1925 |
| 2,237,943 | Lihotzky | Apr. 8, 1941 |
| 2,430,549 | Altman | Nov. 11, 1947 |

FOREIGN PATENTS

| Number | Country | Date |
|---|---|---|
| 7,755 | Great Britain | Apr. 18, 1895 |
| 442,806 | Great Britain | Feb. 17, 1936 |